Patented Jan. 27, 1942

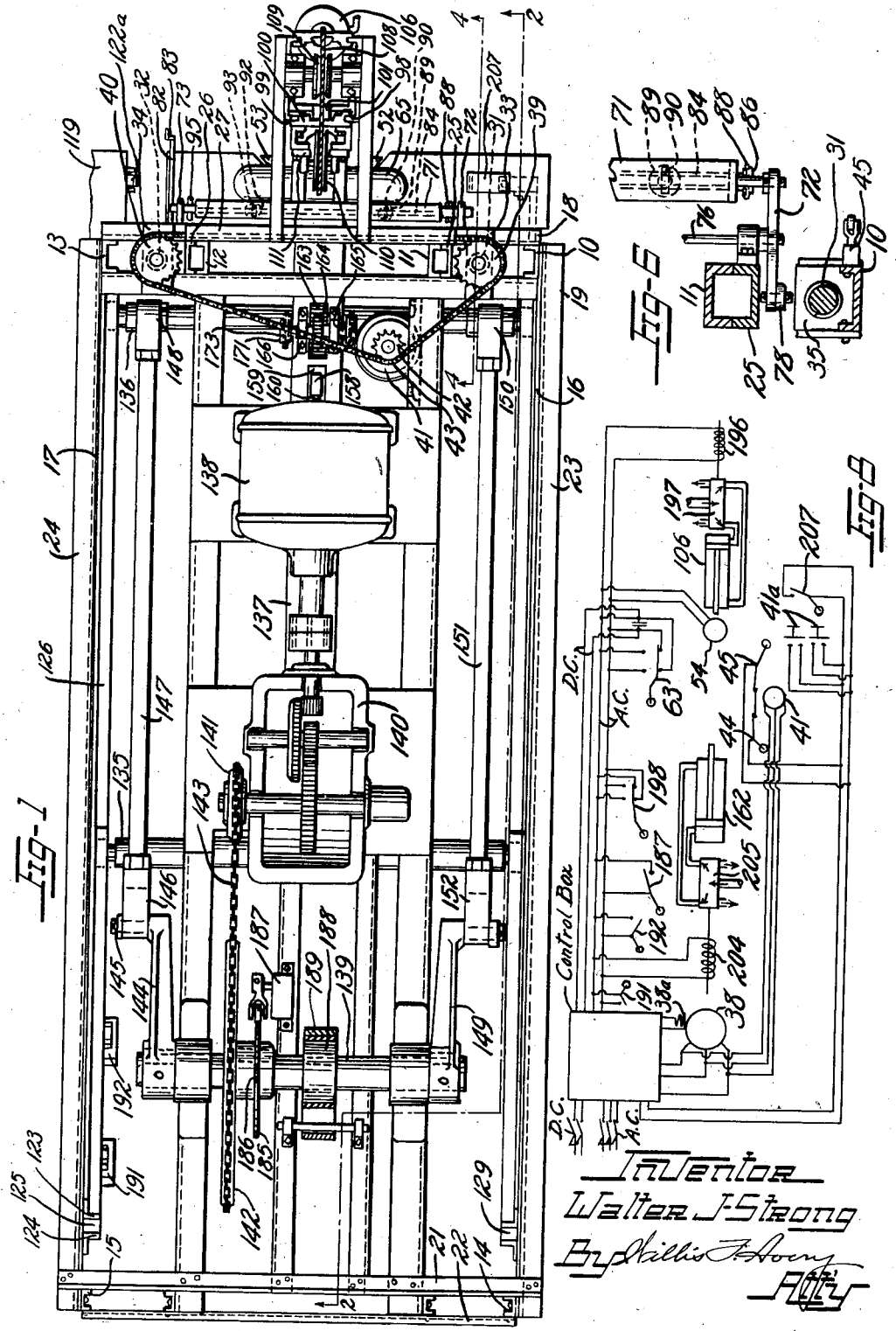

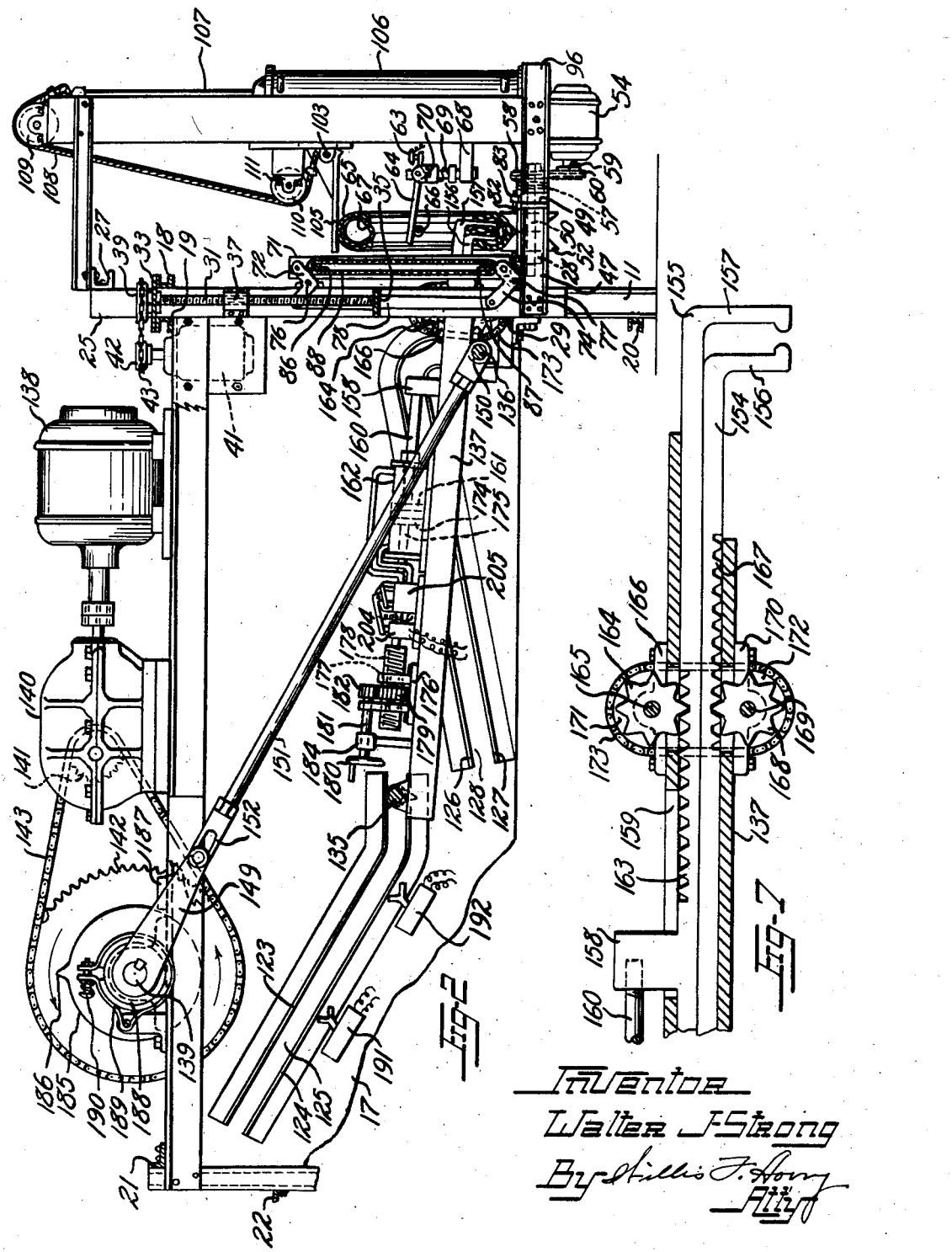

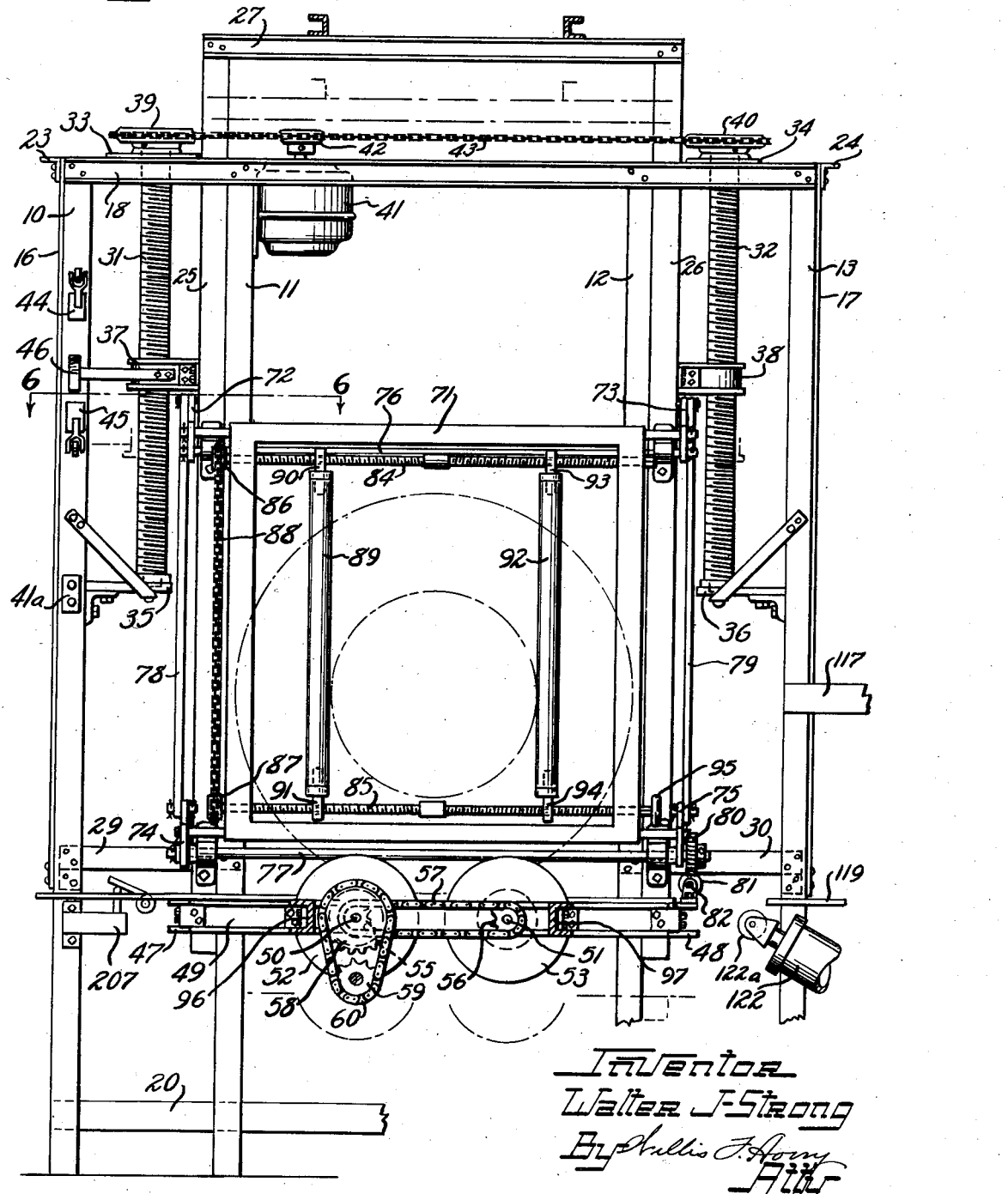

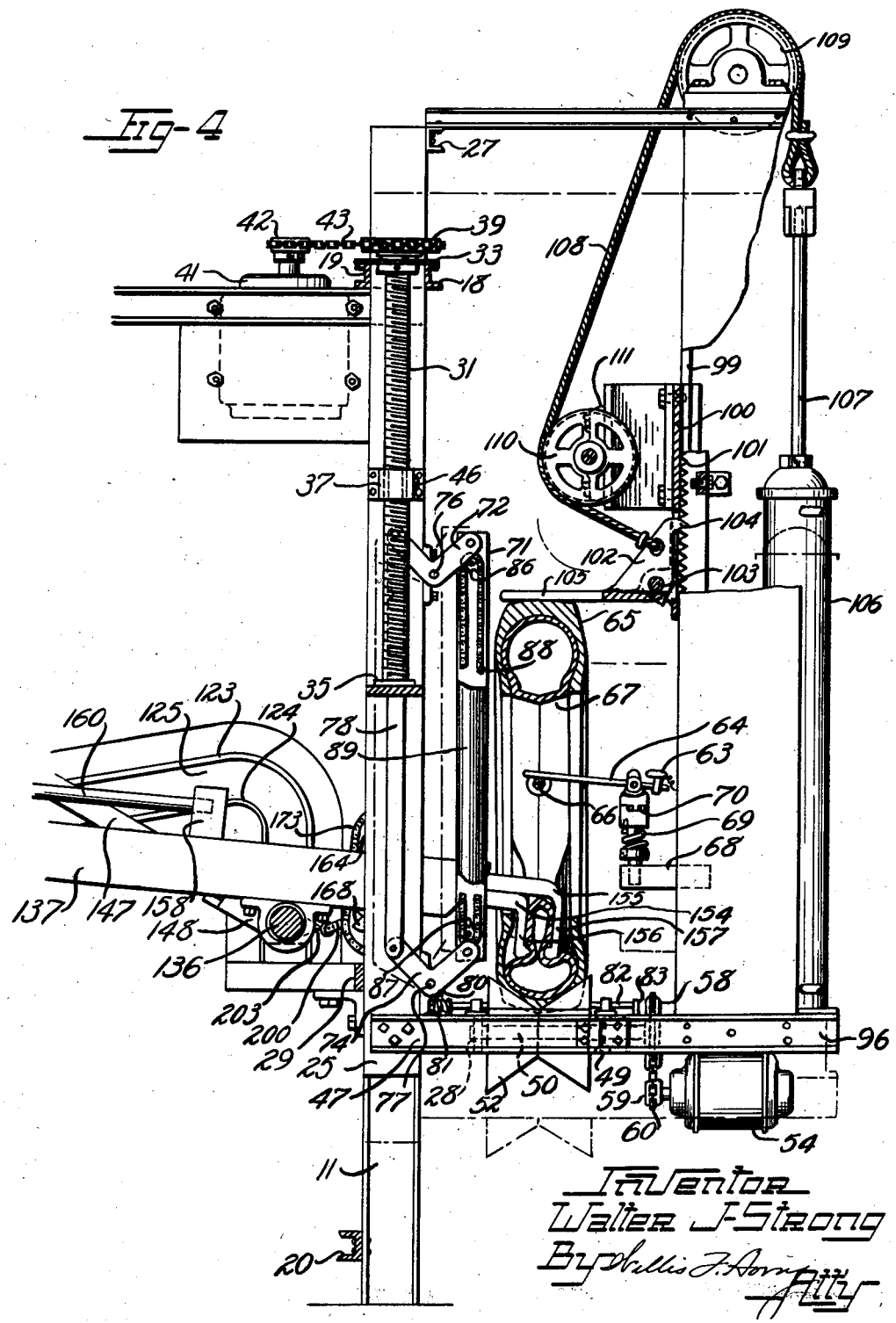

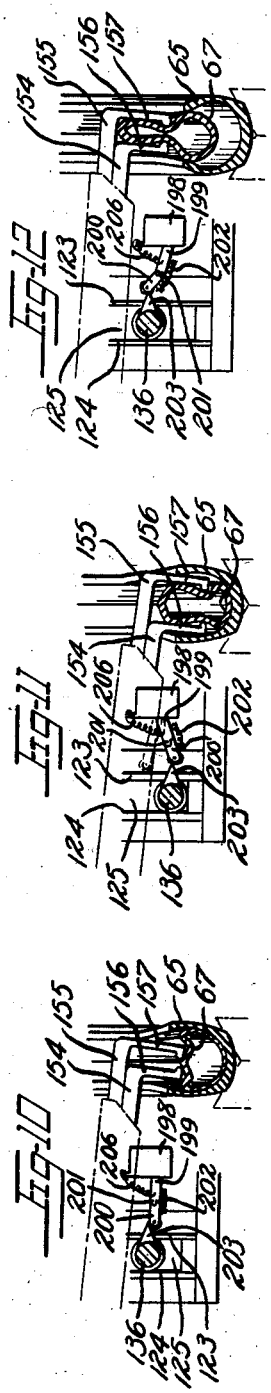
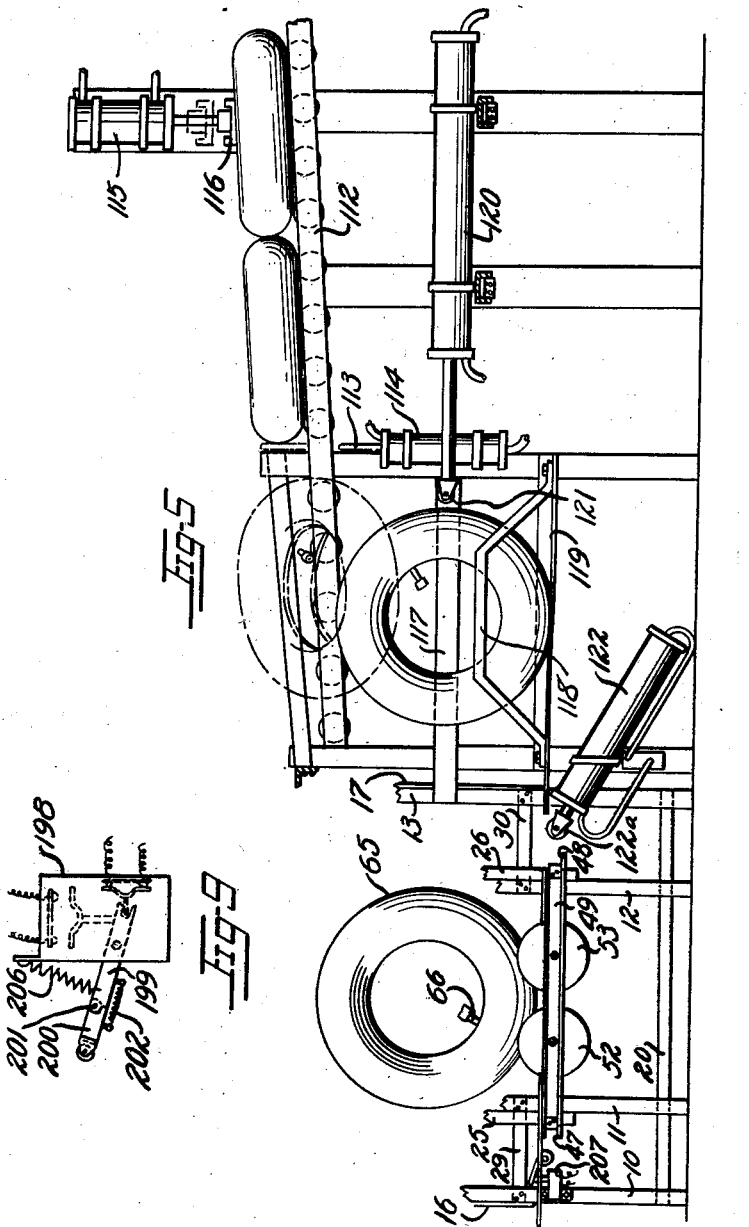

2,271,405

UNITED STATES PATENT OFFICE 2,271,405

REMOVING CURING BAGS

Walter J. Strong, Cuyahoga Falls, Ohio, assignor to The B. F. Goodrich Company, New York, N. Y., a corporation of New York Application March 3, 1939, Serial No. 259,624

16 Claims. (Cl. 18—2)

This invention relates to the method of and apparatus for removing curing bags from the casings of pneumatic tires.

In the manufacture of pneumatic tire casings, it is usual to cure or vulcanize the casings within closed molds while the casing is expanded from within by an expansible curing bag filled with air, steam, or hot water. The removal of these curing bags after the tire casing has been removed from the mold has required considerable distortion of the bag and the casing and the exercise of considerable force. It has been particularly difficult heretofore to avoid kinking of the beads of the tires as the bags have been removed. The present invention provides for the removal of the bags from the casings by improved procedure and apparatus.

Chief objects of the invention are to provide improved protection to the tire, and especially its bead portions, during bag removal, to provide for quickly and securely gripping the bag for removal without injury thereto, and to provide these results by speedy operation.

Other objects of the invention are to provide for automatic holding of the casing while the bag is withdrawn therefrom, automatic rotation of the casing to proper position for removal of the bag, automatic withdrawal of the bag to make possible effective removal without bead spreaders, to provide adjustability to tire casings of different sizes, and to effect economy of effort, accuracy of adjustment, and facility of operation.

These and other objects will appear from the following description and the accompanying drawings.

Of the drawings:

Fig. 1 is a plan view of the apparatus in its preferred form, the casing feeding device being removed.

Fig. 2 is a sectional elevation of the same taken on line 2—2 of Fig. 1, the tire being broken away to show the puller tongs and the valve operated switch, the bag puller being shown in its most advanced position.

Fig. 3 is a front elevation thereof, parts being broken away and parts removed for clarity, the tire casing being indicated in dot and dash lines.

Fig. 4 is a sectional view taken on line 4—4 of Fig. 1 showing the front part of the apparatus to a larger scale, other parts being broken away.

Fig. 5 is a detail view of the casing feeding mechanism, parts being broken away.

Fig. 6 is a detail sectional view taken on line 6—6 of Fig. 3, parts being broken away.

Fig. 7 is a detail sectional view of the bag pulling arm, parts being broken away.

Fig. 8 is a wiring diagram.

Fig. 9 is a detail view of one of the electric switches which controls the bag gripping jaws.

Fig. 10 is a diagrammatic view showing the casing, the gripping jaws and the bag at the start of the gripping operation with the corresponding position of the grip control switch.

Fig. 11 is a similar view at an advanced stage.

Fig. 12 is a similar view at a further advanced stage showing the bag being removed.

Referring to the drawings, the bag pulling means is supported from a stationary frame having stanchions 10, 11, 12, 13 at the front end of the apparatus, and stanchions 14 and 15 at the rear end of the apparatus, stanchions 10 and 14 and stanchions 13 and 15 being attached respectively to sheet metal vertical walls 16 and 17, and the stanchions being further connected to each other by cross members 18, 19, and 20 at the front of the machine, cross members 21 and 22 at the back of the apparatus, and longitudinal members 23 and 24 at the sides of the apparatus, and fastened to the walls 16 and 17 respectively.

The tire-supporting mechanism may be mounted upon a second frame slidably mounted for vertical movement upon the stationary frame and comprising a pair of vertical members 25 and 26 connected together at the top by a cross member 27 and at the bottom by a cross member 28, the members 25 and 26 being adapted to slide along stanchions 10 and 11 and between cross members 18 and 19 at the top of the stationary frame, the lower part of vertical members 25 and 26 bearing against a pair of stationary guides 29 and 30 fixed to the stationary frame.

For raising and lowering the movable frame with respect to the stationary frame for the purpose of adjusting the apparatus to tire casings of different sizes and to provide for such vertical adjustment during the bag pulling operation to increase the radial movement of the bag pulling arm relative to the casing, the following mechanism is provided:

A pair of vertically disposed feed screws 31 and 32 are rotatably mounted in bearings 33, 34 fixed to the cross arms 18, 19 and in thrust bearings 35, 36 mounted on the stanchions 10 and 13. A pair of threaded brackets 37, 38 are fixed to the slidable frame and engage the screws, the arrangement being such that when the screws are rotated in unison, the movable frame is raised or lowered. Sprockets 39, 40 are fixed to the screws and are adapted to be driven in unison by a motor 41 mounted on the stationary frame and having a sprocket 42 in alignment with the sprockets 39, 40 and adapted to drive them through a chain 43. The motor 41 is reversible and is operated by hand from a push button switch 41a. A pair of limit switches 44, 45 are mounted on the stationary frame member 10 and are adapted to be operated by an arm 46 fixed to the sliding frame when the frame reaches the limit of its travel so as to stop the motor automatically.

Fixed to the movable frame is a pair of horizontal frame members 47, 48 connected at their outer ends by a cross member 49. A pair of rotatable shafts 50, 51 are journaled in bearings supported by the cross members 28 and 49 of the slidable frame so as to rotatably support a tire casing and for this purpose have spool shaped rolls 52, 53 fixed thereto respectively. A motor 54 is mounted on the slidable frame and is adapted to drive the spool rolls in unison through sprockets 55, 56 fixed to the shafts respectively and connected by a chain 57, a sprocket 58 fixed to shaft 50, a sprocket 59 fixed to the motor shaft, and a chain 60 trained about the last two named sprockets. Motor 54, normally active, may be stopped automatically by a switch 63 having an arm 64 projecting through the tire 65 when the tire is on the spool rolls by contact of the valve stem 66 of the bag 67 within the tire casing, the arrangement being such that as a tire is rolled into the apparatus from the right side of Fig. 3, this rotates the tire in the bag pulling position until the valve stem is located at a position remote from the path of action of the bag pulling arm, whereupon the stem contacts with and opens the switch 63 stopping rotation of the tire.

To permit the tire casing to pass the switch arm 64 in entering the machine, the switch is rotatably mounted on a vertical axis on the arm 68 fixed to the sliding frame and may be rotated in one direction from its normal position, by contact with the tire against pressure of a torsion spring 69, its return movement, when released, being limited to a stop 70.

To provide for supporting the tire casing laterally against displacement when it is resting on the spool rolls, a rectangular frame 71 is pivotally mounted near its four corners to four bell-cranks 72, 73, 74, 75 fixed to horizontal shafts 76, 77 pivoted on the sliding frame members 25, 26. A link 78 pivotally connects the opposite ends of bell cranks 72, 74, and a similar link 79, similarly connects bell cranks 73, 75. A worm gear 80 fixed to shaft 77 meshes with a worm 81 fixed on a shaft 82 adapted to be rotated by a crank 83. The arrangement is such that frame 71 may be adjusted laterally with respect to the tire casing by parallel motion.

To support tires of different sizes against lateral pull of the bag puller, a pair of right and left threaded feed screws 84, 85 are rotatably mounted on the frame 71. Sprockets 86, 87 are fixed thereto respectively and are connected to rotate in unison by a chain 88. A vertically extending roller 89 is rotatably mounted on nuts 90, 91 threaded to engage feed screws 84, 85 respectively. A second roll 92 is similarly mounted on nuts 93, 94 similarly threaded on the other ends of the feed screws. The feed screws may be rotated by a wheel 95 fixed to screw 85. The arrangement is such that rolls 89, 92 may be adjusted toward and from each other across the frame 71 and parallel to each other. By this adjustment the rolls 89, 92 may be moved to positions with relation to each other and to the tire such that the near bead portion of the tire will be effectively braced and will not be bent excessively or permanently by the outward force exerted against this portion of the tire when the bag is pulled out of the tire between the rolls 89, 92. I have found that for many sizes of tires the apparatus described furnishes adequate protection to the beads, and it has the advantages of very speedy operation, it being unnecessary to manipulate clamping or other protective devices for the tire beads.

To provide for holding the tire casing against lifting when in bag pulling position, a pair of horizontal frame members 96, 97 are fixed to the sliding frame. Guide rails 98, 99 are fixed to and extend vertically between the frame members 96, 97 and the frame members 47, 48. A cross head 100 is slidable vertically along the guide rails. A ratchet rack 101 is fixed to the guide rails. A dog 102 is pivoted at 103 to the cross-head and has a tooth 104 integral with the dog and above its pivot adapted to engage in the rack, and an arm 105 also integral with the dog and adapted to rest on the top of the tire. A double-acting fluid pressure cylinder 106 is mounted vertically on the slidable frame. Its piston rod 107 is connected to a flexible cable 108 extending over an idle pulley 109 pivoted at the top of the frame and down over a second guide pulley 110 pivoted upon the frame to an anchorage 111 on the dog. The guide pulley 110 is so located that the pull against the dog 102 is in a direction to unseat the tooth 104 from the rack 101 whereas when the cable is slack the dog will drop along the slide until contact of the arm 105 with the tread portion of the tire casing will cause the tooth 104 to engage in the rack and prevent upward movement.

For feeding tire casings to the machine in succession and for ejecting them therefrom, the following mechanism is employed. A gravity conveyor 112 extends from the source of supply of tire casings containing curing bags to a position adjacent the apparatus previously described. A stop 113 is located near the delivery end of the conveyor and is adapted to be projected into the path of the tire casings, which are advanced laying on their sides, or to be withdrawn therefrom by a double acting fluid pressure cylinder 114. A similar cylinder 115 controls a clamp 116 precedent in the path of travel of the tires and adapted to engage the tire casing following the one stopped by the stop 113 by clamping it against the conveyor. The arrangement is such that by alternating the movements of the stop and the clamp, the assembly acts as an escapement to feed the tires intermittently from the conveyor.

As the tires reach the end of the gravity conveyor they drop off one at a time in on edge relation where they are supported laterally by a fence 117, 118 on either side. They rest upon a runway 119 ready to be pushed into position on the spool rolls. A horizontal cylinder 120 mounted upon a stationary post of the frame of the machine is adapted to actuate a pusher 121 whereby the tire may be pushed from the runway 119 to a position where it rests upon the spool rolls.

After the curing bag has been pulled from the tire casing, the casing is ejected from the machine by a fluid pressure cylinder 122, the piston rod of which carries a roller 122ª adapted to engage the tread of the casing from below at an angle acute to the vertical and to exert a force upwardly and in the direction of movement of the casings.

The mechanism for withdrawing the curing bag from the casing is as follows: Mounted on the inner side of the wall 17 of the stationary frame is a set of guides 123, 124 defining a channel 125 and a set of guides 126, 127, defining another channel 128. Similar guides are mounted on the opposing side of wall 16. A bar 135 extends between the walls with one end located in channel 125 and its opposite end located in the opposite channel 129. A second bar 136 has one end guided in channel 128 and its opposite end guided in the opposite channel 130. The ends of the bars carry anti-friction collars which ride in the channels. Fixed to the bars 135, 136 is a tubular arm 137 which is preferably of rectangular cross-section. The arm 137 is driven in its bag pulling movements by a motor 138 mounted on the stationary frame, the motor drives a horizontal crank shaft 139 through a geared speed reducer 140, a sprocket 141 on the speed reducer, a sprocket 142 fixed to the shaft 139, and a chain 143. A crank arm 144 is also fixed to one end of shaft 139 and is pivotally connected, as at 145, by a slotted lost motion connection 146 to a pitman 147 which is pivotally connected to the bar 136 as at 148. A similar crank 149 is fixed to the other end of shaft 139 and is pivotally connected as at 150, to the bar 136 by a similar pitman 151 through a similar lost-motion connection 152. The arrangement is such that as the shaft 139 is rotated by the motor 138 in the direction indicated by the arrow in Fig. 2 the arm 137 is given an oscillating movement endwise and also vertically by reason of the contour of the guide channels. The lost motion connections of the pitmans provide for permitting the forward end of the beam to drop when the bar 136 reaches a vertical portion of the guide channels at the extreme end of the travel of the beam to the right of Fig. 2, and to permit the beam to dwell at the lowered position while its gripping jaws are engaging the curing bag before the beam starts its upward movement.

Slidably mounted within the arm 137, for movement longitudinally thereof, are a pair of tongs 154, 155 each having a downwardly extending jaw 156, 157 for gripping a curing bag. A lug 158 on tong 155 extends through an elongate slot 159 in arm 137 and is fixed to a piston rod 160 attached to the piston 161 of a fluid pressure cylinder 162, whereby the tong 155 may be moved back and forth along the arm. A rack 163 on the tong engages a pinion 164 fixed to a shaft 165 rotatably mounted in a bearing 166 on arm 137, the pinion extending through a slot in the arm 137 to engage the rack. A similar rack 167 on tong 154 is similarly engaged by a pinion 168 on a shaft 169 having a bearing 170 on the same arm. Sprockets 171, 172 fixed to shafts 165, 169 respectively engage a chain 173 looped thereabout so that the shafts and their pinions travel in unison. The arrangement is such that the tong jaws 156, 157 are simultaneously moved toward and away from each other.

To limit approach of the tong jaws toward each other, so as not to injure the curing bag by compression, a stop 174 is located within the cylinder on a rod 175. The outer end of the rod is slidably guided through a bifurcated bracket 176 fixed to arm 137 and is prevented from turning by a feather key 177 on the bracket which engages a keyway 178 in the rod. This part of the rod is also threaded to engage the threaded hub of a gear 179 rotatably mounted between the arm of the bifurcated bracket. The gear 179 may be rotated by a hand-wheel 180 fixed to a shaft 181 to which is also fixed a pinion 182 meshing with the gear, the shaft being rotatably mounted on arm 137 in a bearing 184 and in bearing 176.

The motor 138 which advances and retracts the puller arm is energized by the closing of switch 63. The cycle of movement of the arm 137 takes place during one revolution of the crank shaft 139. To stop the crank shaft at the end of the cycle, a cam disc 185 is fixed to the crank shaft and has a projection 186 adapted to engage and open a switch 187 in its path. A brake disc 188 is also fixed to the shaft and engages a band brake 189 anchored to the stationary frame. The brake is adjusted by a screw 190 to drag constantly so as to tend to overcome over-running of the shaft and to hold the shaft stationary against rotation due to unbalanced gravitational force acting on the beam 137. To cause quick deceleration of the motor, a direct current dynamic brake comprising a winding 138ª incorporated in the motor, see Fig. 8, is energized when the alternating current to the motor 138 is shut off and the motor is to be stopped as hereinafter described.

In operation, the arm 137 and its movable jaws may be controlled automatically so as to advance from its rearmost position to a position where its jaws are within the bead opening of the casing. During this movement the jaws 156, 157 are adjusted to approach each other closely. The arm is then gravitationally moved radially of the casing with the bar 136 within the vertical portion of the channels, and the jaws enter between the beads of the casing and bear down upon the curing bag which is depressed thereby as shown in Fig. 10. The jaws are then opened and the curing bag, due to its resilience rebounds into the space therebetween as shown in Fig. 11. The jaws are then closed over the bag, gripping a considerable portion of it as shown in Figs. 4 and 12. The arm is now raised radially of the tire and is then retracted rearwardly pulling the bag from the casing while the latter is braced and its bead portions protected by the rolls 89, 92, and depositing the bag on the floor, at which point the jaws open and release the bag.

While the arm 137 is making its movements radial of the casing, the casing itself may be raised or lowered by operating the motor 41 to amplify the relative movement, as where the casing is of relatively large diameter.

Where manual operation is desired as where casings of different sizes and shapes are to be operated upon in succession, the various fluid pressure cylinders may be controlled from push buttons by solenoid operated valves, which push buttons together with others, which through solenoids control the electric motors may be conveniently located at one station where the attendant, by control of the buttons, may perform the operations. It is possible with such an arrangement to stop the machine at any state of operation, or to operate it step by step so as to perform difficult bag pulling operations without injury to the bag or to the tire casing.

Where the casings are all of one size the valves and switches may be controlled automatically at a saving of effort. For this purpose I prefer the following mechanism. Located along the guide channel 125 is a contact switch 192 adapted to be engaged by a projection 195 on the bar 135 to energize a solenoid 196 when the bar 135 passes it in a direction approaching the tire casing, and to de-energize it when the bar 135 passes it in the opposite direction. Solenoid 196 operates a four-way valve 197 controlling the supply of pressure fluid to cylinder 106. The arrangement is such that as the beam 137 starts toward the tire, the hold-down 105 is lowered against the tire casing and as the beam is retracted the hold-down is raised.

A switch 198 is located along the vertical portion of the channel 125. This switch comprises a pivoted arm 199 having an extension 200 hinged thereto, as at 201 so as to swing independently and freely thereon when depressed in one direction and to move only with the arm when depressed in the opposite direction, independent movement of the extension being resisted by a spring 202. The extension is adapted to be moved in either direction by a stop 203 on bar 136. As the bar 136 drops down the vertical portion of the guideway stop 203 presses extension 200 downwardly deenergizing the motor 138 and energizing the dynamic brake 138ª. The same switch, on further downward movement of the bar 136, energizes a solenoid 204 of a fluid pressure valve 205, located on beam 137 and controlling cylinder 162 to cause the jaws 156, 157 to separate, as shown in Fig. 11 to receive the bag therebetween.

As the stop 203 passes beyond the arm 199, that arm is returned by a spring 206 opening the switch 198 and thereby deenergizing the solenoid 204 to reverse the valve 205 to close the jaws 156, 157 on the bag. At the same time, the motor 138 is also energized by return of arm 199, to start the beam on its return movement. As the beam is raised to withdraw the bag the stop 203 passes the arm 199 by deflecting the extension 200 without changing the electrical contacts, as seen in Fig. 12.

As the beam 137 returns the projection 195 on the bar 135 throws the switch 192 in the opposite direction causing the solenoid 196 to be deenergized reversing valve 197 to raise the hold-down 105 from the tire casing.

Located at the left end of the channel 125, as seen in Fig. 2, is a limit switch 191 adapted to be operated by the stop 195 on bar 135. As the beam 137 nears the end of its retractive movement it contacts the switch 191 which causes the jaws 156, 157 to separate and drop the bag. Thereafter the switch is released again closing the jaws as the beam comes to rest by cam 186 contacting switch 187 to deenergize the motor 138 and to momentarily energize the dynamic brake.

The apparatus, illustrated in Fig. 5, for feeding tire casings into the bag pulling mechanism may be operated through solenoid controlled valves by push buttons or switches conveniently located at the operator's station, or automatically controlled by the pulling mechanism.

For hand operation one switch may be used to advance and retract the roller 122ª, a second switch may be employed to advance and retract the pusher 121 to feed a tire casing at a time into the machine, and a third switch may be employed to simultaneously raise and lower the stop 113 and the clamp 116. If desired, however, a switch 207 may be located in the path of tire casings ejected from the spool rolls and adapted to energize a solenoid valve to advance the pusher 121 to place a new casing on the spool rolls. Movement of the stop 113 and clamp 116 to feed tires to the pusher 121 may similarly be controlled by a valve operated upon return of the pusher 121 either hydraulically or electrically.

Modifications of the invention may be made without departing from the invention as it is defined by the following claims.

I claim:

1. The method of removing a resilient curing bag from a tire casing, said method comprising advancing a pair of gripping elements into the casing while the elements are held relatively close together as compared to the width of the bag to depress the inner face of the bag in the casing, separating the elements to permit the curing bag to recover from its depressed condition and occupy a position between the elements, gripping the bag between the gripping elements, and withdrawing the bag by movement of the gripped portion out of the casing.

2. The method of removing curing bags as defined by claim 1 in which the operations are performed in step by step movements.

3. The method of removing curing bags as defined by claim 1 in which the operations are performed automatically in a continuous cycle.

4. The method of removing a resilient curing bag from a tire casing, said method comprising advancing a pair of gripping elements axially and then radially of the casing while the elements are held relatively close together as compared to the width of the bag to depress the inner face of the bag in the casing, separating the elements to permit the curing bag to recover from its depressed condition and occupy a position between the elements, gripping the bag between the gripping elements, and withdrawing the bag by radial movement of the gripped portion and movement of the casing in the opposite direction, and then moving the gripped portion axially to withdraw the remainder of the bag.

5. Apparatus for removing a resilient curing bag from a tire casing, said apparatus comprising means for supporting a tire casing against radial movement, an arm having a pair of gripping jaws adjustable toward and from each other, means for advancing the arm and gripping jaws axially and then radially of the casing to enter the jaws between the beads of the casing while the elements are held relatively close together as compared to the width of the bag to depress the bag in the casing, means for separating the jaws to permit the bag to rebound to a position between the jaws, means for closing the jaws to grip a portion of the bag, and means for moving the arm to withdraw the jaws and bag from the casing.

6. Apparatus for removing a curing bag from a tire casing, said apparatus comprising means for supporting the tire in bag pulling position including an adjustable frame and means thereon for blocking the casing against radial movement in at least one direction, bag gripping means movable into and out of the casing for withdrawing the bag, and means for moving said supporting means with the casing thereon radially of the casing independent of said blocking means.

7. Apparatus for removing a curing bag from a tire casing, said apparatus comprising a set of cradle rolls for receiving the tire casing, means for driving the cradle rolls to rotate the casing to pulling position, and means operated by rotation of the casing for automatically stopping the cradle rolls when the tire has reached a desired position.

8. Apparatus for removing a curing bag from a tire casing, said apparatus comprising means for holding a casing, a bag puller adapted to move into and out of the opening in the casing and having a pair of jaws adapted to close over a portion of the bag to grip it for removal of the bag from the casing, and adjustable means for limiting the movement of the jaws toward each other to prevent injury to the bag.

9. Apparatus for removing a curing bag from a tire casing, said apparatus comprising a set of cradle rolls for supporting the casing at its tread face, means for gripping a portion of the bag and removing it by an initial movement radially of the casing, and means movable against the tread of the casing opposite the cradle rolls for blocking it against said radial movement.

10. Apparatus for removing curing bags from tire casings, said apparatus comprising a set of cradle rolls adapted to rotate the casing to proper position, means for feeding casings in succession to said cradle rolls, means for pulling a curing bag from a casing supported by said cradle rolls, and means adjustable axially of the casing for supporting the casing laterally against the pull.

11. Apparatus for removing a curing bag from a tire casing, said apparatus comprising a stationary frame, a movable frame slidably mounted thereon, a set of cradle rolls on the movable frame adapted to support a tire casing from its tread face, means for engaging the bag and pulling it from the casing, means for moving the movable frame with relation to the stationary frame during the pulling movement, and means carried by the movable frame and adjustable with relation thereto for supporting the casing against the pull.

12. Apparatus for removing a curing bag from a tire casing, said apparatus comprising a stationary frame, a movable frame slidably mounted thereon, a set of cradle rolls on the movable frame adapted to support a tire casing at its tread face, means for engaging the bag and pulling it from the casing, means for moving the movable frame with relation to the stationary frame during the pulling movement, and means carried by the movable frame and adjustable axially with relation to the casing for supporting the casing against the pull.

13. Apparatus for removing a curing bag from a tire casing, said apparatus comprising a stationary frame, a movable frame slidably mounted thereon, a set of cradle rolls on the movable frame adapted to support a tire casing at its tread face, means for engaging the bag and pulling it from the casing, means for moving the movable frame with relation to the stationary frame during the pulling movement, and means carried by the movable frame and adjustable radially with relation thereto for supporting the casing against the pull.

14. Apparatus for removing curing bags from tire casings, said apparatus comprising a set of cradle rolls, means for feeding tire casings successively to a position on said rolls, a motor actuated by a means in the path of feed for driving said rolls to rotate the tire casing about its axis, and means pivotally mounted in the path of said feed and deflectable from said path by a passing casing, said last-named means being adapted to contact with the valve stem of the curing bag during rotation of the tire to stop said motor with the stem in the desired relation to bag-pulling means located adjacent the cradle rolls.

15. Apparatus for removing a curing bag from a tire casing, said apparatus comprising means for supporting a casing without substantial deformation thereof from annular form, means for gripping a bag and pulling it out of the casing, and means for bracing the bead portions of the casing against excessive lateral bending during the bag removing operation, said bracing means comprising a plurality of members extending across the bead portions of the casing and being spaced apart sufficiently to permit the withdrawal of the bag between them.

16. Apparatus as defined in claim 15 in which the said members of the bracing means comprise a pair of elongated rollers.

WALTER J. STRONG.